United States Patent Office 3,536,711
Patented Oct. 27, 1970

3,536,711
8-ACYLAMINO- AND 8-CARBALKOXY-
AMINOPURINES
George L. Dunn, Wayne, and Richard Vogt Berthold,
King of Prussia, Pa., assignors to Smith Kline & French
Laboratories, Philadelphia, Pa., a corporation of
Pennsylvania
No Drawing. Filed July 21, 1967, Ser. No. 654,994
Int. Cl. C07d 57/64
U.S. Cl. 260—252                                  8 Claims

ABSTRACT OF THE DISCLOSURE

Novel 8-acylaminopurines, which may be optionally substituted on the pyrimidine nucleus, having activity against helminthiasis in animals are disclosed. A process for their preparation involves reacting an optionally substituted 4,5-diaminopyrimidine with an acyl-S-lower alkyl pseudothiourea, which preferentially gives the 8-carbalkoxy and 8-carbaryloxyaminopurines. Another process involves reacting optionally pyrimidine ring substituted 2-aminopurine with an appropriate acyl halide, which preferentially gives 8-carbalkyl- and 8-carbarylamidopurines.

---

This invention relates to novel 8-acylaminopurines.

According to one aspect of the invention, there are provided an anthelmintic composition and method of producing anthelmintic activity which utilizes as the essential active ingredient certain 8-acylaminopurines represented by the general formula:

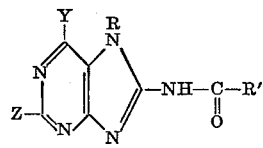

FORMULA I wherein R is a lower alkyl group containing from one to five carbon atoms, or preferably hydrogen;

R' is alkyl, straight or branched, containing from one to ten carbon atoms; cycloalkyl, including alkyl cycloalkyl, containing from three to ten carbon atoms; alkoxy, straight or branched, containing from one to ten carbon atoms; cycloalkoxy, including alkyl cycloalkoxy, containing from three to ten carbon atoms; alkenyl, straight or branched chain, containing from two to ten carbon atoms; alkenyloxy containing from two to ten carbon atoms, alkynyl, straight or branched, containing from two to ten carbon atoms, alkynyloxy containing from two to ten carbon atoms; phenyl; phenyloxy; naphthyl, α or β; and Y and Z are hydrogen; alkyl, straight or branched, containing from one to ten carbon atoms; alkoxy, straight or branched, containing from one to ten carbon atoms; phenyl, trifluoromethyl; amino; halogen, preferably chloro or bromo; hydroxy; nitro; alkylthio; alkylamino; dialkylamino; dialkylamionalkyl; cyano; acylamino containing from two to seven carbon atoms; carboxy; carbalkoxy containing from two to seven atoms; N-alklycarboxamido; or N,N-dialkylcarboxamido; with the alkyl substituents not specifically defined from one to eight carbon atoms.

It is preferred to use as the active ingredient of the novel compositions of this invention, compounds as shown in Formula II below:

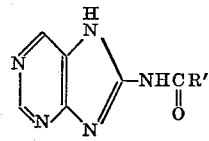

FORMULA II wherein R' is alkyl, straight or branched, containing from one to seven carbon atoms; cycloalkyl containing from three to seven carbon atoms; alkoxy, straight or branched, containing from one to seven carbon atoms; or cycloalkoxy containing from three to seven atoms.

For brevity, the common name, 8-acylaminopurines, will be used throughout this disclosure, where acyl is defined herein as including the organic radicals; carbalkyl (RCO), carbalkoxy (ROCO), carbaryl (ArCO) and carbalkyl (ArOCO); and 2 derivatives thereof substituted on the 6-membered heterocyclic ring.

Certain alkyl esters of purine carbamic acids not substituted in the 8-position have been mentioned in the literature but no significant pharmacological activity was attributed to them.

Specifically disclosed in the art are: (1) alkyl esters of purine-6-carbamic acid by Giner-Sorolla et al., J. Am. Chem. Soc., 80; 3932 (1958); and by Dyer et al., 6; 289 (May, 1963).

Examples of specific novel compounds falling within Formula I are:

Purine-8-carbamic acid, methy ester
Purine-8-carbamic acid, n-propyl ester
Purine-8-carbamic acid, n-pentyl ester
8-acetamidopurine
8-cyclopropylcarboxamidopurine
2-methyl-8-cyclopropylcarboxamidopurine
6-ethyl-8-cyclobutylcarboxamidopurine
Purine-8-carbamic acid, n-butyl ester
Purine-8-carbamic acid, allyl ester
6-methoxy-8-acetamidopurine
2-chloro-8-acetamidopurine
6-butoxypurine-8-carbamic acid, methyl ester
2-butylpurine-8-carbamic acid, n-propyl ester
6-methylthio-8-carbomethoxyaminopurine
2-ethylaminopurine-8-carbamic acid, isopropyl ester
8-n-propylcarboxamidopurine
6-dimethylaminopurine-8-carbamic acid, n-pentyl ester
2-chloro-8-n-propylcarboxamidopurine It will be readily apparent to one skilled in this art that certain of the substituted 8-acylaminopurines compounds (where R', Y or Z are branched) of this invention may have asymmetric carbon atoms, forming optically active d- and l-compounds. The connotation of the general formulas presented herein is intended to include the separated d- or l-optical isomers, as well as racemic mixtures of these isomers.

If desired, the isomers may be separated for individual use by resolution methods known to the art, such as fractional crystallization of derivatives or salts embodying a second resolved optically asymmetric center. Alternatively, a synthesis starting with an optically active side chain may yield the desired optical isomers.

The compounds of Formula I being bases will normally form salts with inorganic and organic acids. Accordingly, the non-toxic salts formed with pharmaceutically acceptable inorganic and organic acids or alkali metal bases may be alternatively employed in the composition of the invention. Other nontoxic molecular complexes known to exist that can be derived from compounds or Formula I may also be used in this invention, since the anthelmintic activity rests in the 8-acylaminopurine structure itself.

The compounds of Formula I in which R is hydrogen and R' is a carbalkoxy or carbaryloxy group can be prepared by treating an optionally substituted 4,5-diaminopyrimidine with one or two equivalents of a monoacyl or diacyl S-lower alkylpseudothiourea in an acidic solution, at a temperature of from 0° to 200° C., and at a pH of from 4 to 9 for 10 hours to 30 minutes, to give the correspondingly substituted 8-carbalkoxy- and 8-carbaryloxyaminopurine.

The acyl-S-lower alkylpseudothioureas can be prepared by treating an S-lower alkylpseudothiourea with one to two equivalents of the appropriate acyl halide in a cooled aqueous, alcoholic acetone medium, maintaining the pH at 5 to 9 during the course of the reaction. The acyl S-lower alkylpseudothiourea may be isolated by extraction into a suitable water-immiscible organic solvent, followed by drying and evaporation of the solvent. This method is preferred for the preparation of 8-carbalkoxy and 8-carbaryloxyaminopurines.

An alternative process for making novel compounds of this invention involves treating the optionally substituted 4,5-diaminopyrimidine with carbon disulfide in the presence of potassium hydroxide in ethanol at from 30° to 100° C. for from 10 hours to 30 minutes, alkylating the resultant 8-thiopurine with a methyl halide (preferably methyl iodide) in basified ethanol, while maintaining the pH from 6 to 10, heating the resultant 8-methylthiopurine in an aqueous ammonia solution containing a copper salt and copper alloy catalyst at a temperature of from 50° to 250° C. to yield the correspondingly substituted 8-aminopurine. This product can then be treated with an appropriate acyl halide, first in cold pyridine; and then, if necessary the pyridine solution can be heated, to give the correspondingly substituted 8-carbalkylaminopurine. This method is preferred for the preparation of 8-carbalkyl- and 8-carbarylamidopurines.

The o-diaminoheterocyclo reactants can have additional substituents on the heterocyclic ring which correspond to Y and Z as defined in Formula I. The resulting purines bear these substituents at the corresponding 2 or 6 position of the 6-membered heterocyclic ring. The nature of these condensation reactions are such that they are generally applicable to o-diaminoheterocycles regardless of the substituents which may appear on the heterocyclic ring.

The acyl halide reactants can be acyl chloride or acyl bromides, the acyl chlorides preferred for reasons of availability and cost. The choice of the acyl (e.g. R, RO, Ar or ArO) substituted halide is of course dependent upon the particular acyl product desired.

The compounds of Formula I wherein R is lower alkyl are prepared by alkylating an 8-acylaminopurine with an appropriate lower alkyl halide in the presence of potassium carbonate to give a mixture of the correspondingly substituted 7- and 9-lower alkyl-8-acylaminopurine. The isomers can be separated by column chromatography and fractional crystallization.

The compounds of Formula I wherein R' is lower alkoxy, cycloalkyl or lower alkyl and either Y or Z is alkylamino can be prepared by subjecting 2-N-lower alkylamino-o-diaminopyrimidine to the afore-discussed thiourea process, or the afore-discussed carbon disulfide-ammonia-acylhalide process. The 2-N-lower alkylamino-4,5-diaminopyrimidines can be prepared as follows: 4-amino-2-chloro-5-nitropyrimidine [J. Chem. Soc., 474 (1951)] is heated at 100° C. in methanol with the appropriate alkylamine. The resultant 2-alkylamino-4-amino-5-nitropyrimidine is reduced with sodium dithionite at 60° C. in water to give the appropriately substituted 2-N-lower alkylamino-4,5-diaminopyrimidine, which is converted to the correspondingly substituted 2-N-lower alkylamino-8-acylaminopurine.

Starting with 6-N-lower alkylamino-4,5-aminopyrimidine, and following the process described above gives the correspondingly substituted 6-N-lower alkylamino-8-acylaminopurine.

The compounds of Formula I where R' is lower alkyl, cycloalkyl or lower alkoxy, and either of Y or Z is trifluoromethyl, can be prepared by subjecting a trifluoromethyl substituted-o-diaminopyrimidine to the afore-discussed thiourea process, or to the afore-discussed carbon disulfide process. The trifluoromethyl-o-diaminopyrimidine can be made as follows:

4,5-diaminopyrimidine-monocarboxylic acid is treated with sulfur trifluoride in hydrogen fluoride to give the correspondingly trifluoromethyl - 4,5 - diaminopyrimidine, which is converted by the afore-discussed thiourea method or the afore-discussed cyanamide method to the correspondingly substituted trifluoromethyl-2-acylaminopurine.

The compounds of Formula I where R' is alkenyl, alkenyloxy, alkynyl or alkynyloxy, can be prepared by subjecting an optionally substituted 4,5-diaminopyrimidine to a reaction with the appropriately mono- or di- alkenyl, alkenyloxy, alkynyl or alkynyloxy carbonyl S-lower alkyl pseudothiourea. The starting materials can be prepared as earlier described.

The compounds of Formula I where R' is lower alkyl, cycloalkyl or lower alkoxy, either one or both of Y or Z are lower alkyl can be prepared by subjecting the appropriate mono- or di- lower alkyl o-diaminopyrimidine to either the aforementioned thiourea process, or the aforementioned carbon disulfide ammonia-acyl process. The alkylated diaminopyrimidines can be prepared as follows:

The 2-alkyl-4,6-dihydroxypyrimidine is nitrated with nitric acid in the presence of acetic acid to give the 2-alkyl-4,6-dihydroxy-5-nitropyrimidine. This intermediate is chlorinated with phosphorous oxychloride in diethylaniline to give the 2-alkyl-4,6-dichloro-5-nitropyrimidine, which is converted into 2-alkyl-4-amino-6-chloro-5-nitropyrimidine by methanolic ammonia in ether. This latter intermediate is reduced with sodium hydrogen sulfide to give the 2-alkyl-4,5-diamino-6-mercapto-pyrimidine which on reduction with Raney nickel in ammonia water gives the 2-alkyl-4,5-diaminopyrimidine. This o-diaminopyrimidine is converted by the aforediscussed thiourea method to the appropriate 2-alkyl-8-acylaminopurine.

The appropriate ethyl carboalkyl-acetate can be treated with thiourea to give the 6-alkyl-4-hydroxy-2-mercaptopyrimidine which on hydrolysis with chloroacetic acid gives the 6-alkyl-2,4-dihydroxypyrimidine. This latter intermediate can be nitrated with nitric acid in the presence of sulfuric acid to give the 6-alkyl-5-nitro-2,4-dihydroxypyrimidine which is then chlorinated with phosphorous oxychloride in diethylaniline to give the 6-alkyl-5-nitro-2,4-dichloropyrimidine. This latter intermediate is treated with alcohol ammonia to give the 6-alkyl-5-nitro-4-amino-2-chloropyrimidine which is then reduced with sodium hydrogen sulfide to the 6-alkyl-4,5-diamino-2-mercaptopyrimidine. This latter intermediate is then then treated with Raney nickel in ammonia water to give the 6-alkyl-4,5-diaminopyrimidine. This o-diaminopyrimidine is converted by the afore-discussed thiourea method to the appropriately 6-alkyl-8-acylaminopurines.

2,6-dialkyl substituted 8-acylaminopurines can be prepared by subjecting the appropriate 2,6-dialkyl-4,5-diaminopyrimidine to the afore-discussed thiourea process. The 2,6-dialkyl-4,5-diaminopyrimidine can be prepared by nitrating the appropriately substituted 2,6-dialkyl-6-hydroxypyrimidine with nitric acid in acetic acid to give the 5-nitro-2,6-dialkyl-4-hydroxypyrimidine which is treated with phosphorous oxychloride in diethylaniline to give the 5-nitro-2,6-dialkyl-4-chloropyrimidine which is treated with methanolic ammonia in ether to give 5-nitro-2,6-dialkyl-4-aminopyrimidine which is reduced with sodium hydrogen sulfide to give the 4,5-diamino-2,6-dialkylpyrimidine which is subjected to the afore-discussed thiourea process to give the 2,6-dialkyl-8-acylaminopurine.

The compounds of Formula I in which R' is lower alkyl, cycloalkyl or lower alkoxy, either Y or Z is dialkylamino, and the other is hydrogen, can be prepared by subjecting the appropriate substituted dialkylamino-4,5-diaminopyrimidine to the afore-discussed thiourea process or to the carbon disulfide-ammonia-acyl halide process. The dialkylamino-4,5-diaminopyrimidine can be made as follows:

4-amino-2-chloro-5-nitropyrimidine is heated at 100° C. in methanol with the appropriate dialkylamine. The resulant 2-dialkylamino-4-amino-5-nitropyrimidine is reduced with sodium dithionite at 60° C. in water to give the appropriately substituted 2-N-dialkylamino-4,5-diaminopyrimidine, which is converted to the correspondingly substituted 2-N-dialkylamino-8-acylaminopurine.

Starting with 6 - N - dialkylamino-4,5-aminopyrimidine, and following the process described above gives the correspondingly substituted 6 - N - dialkylamino-8-acylaminopurine.

The compounds of Formula I where R' is lower alkyl or lower alkoxy, Z is alkoxy, and Y is hydrogen can be prepared by subjecting the alkoxy-4,5-diaminopyrimidine to the afore-discussed thiourea or carbon disulfide process. The 2-alkoxy-o-derivative can be prepared as follows:

4-amino-2-chloro-5-nitropyrimidine is treated with the appropriate alcoholic alkoxide to give the 2-alkoxy-4-amino-5-nitropyrimidine which is catalytically hydrogenated to the 2-alkoxy-4,5-diaminopyrimidine. This latter intermediate is then converted by the afore-discussed thiourea method or carbon disulfide-ammonia-acyl halide method to the correspondingly 2-alkoxy substituted 8-acylaminopurine.

5,6-dinitro-4-aminopyrimidine is catalytically hydrogenated to give 4,5,6-triaminopyrimidine which is converted by the afore-discussed thiourea method to the 6-amino-8-acylaminopurine. This latter intermediate is treated with the appropriate alcohol-alkyl nitrate mixture containing one equivalent of mineral acid to give the correspondingly substituted 6-alkoxy-8-acylamino.

The compounds of Formula I wherein R' is lower alkyl, cycloalkyl or lower alkoxy, and Y and Z are both alkoxy can be prepared by subjecting 2,6-dialkoxy-4,5-diaminopyrimidine to the afore-discussed thiourea process of the carbon disulfide-ammonia-acyl halide process. The dialkoxy-4,5-diaminopyrimidines can be made as follows:

2,6-dichloro-4-amino-5-nitropyrimidine is treated with the appropriate alcohol alkoxide. The resultant 2,6-dialkoxy-4-amino-5-nitropyrimidine is catalytically hydrogenated to give the 2,6 - dialkoxy - 4,5 - diaminopyrimidine, which is converted by the afore-discussed thiourea method to the correspondingly substituted 2,6-dialkoxy-8-acylaminopurine.

The 8-acylaminopurines of Formula I have been found to possess useful anthelmintic properties, that is, broad spectrum activity against parasites of warm blooded animals, including both mature and immature parasitic forms. In particular, these compounds have been found to exhibit high activity against various helminthic infections of the intestinal tract of economically important animals, coupled with lower systemic toxicity to the host animal.

For example, the disclosed compounds are generally effective in clearing mice of worm infection for laboratory purposes, among others: *Syphacia obvelata* and *Aspicularis tetraptera* (mouse pinworm), *Nematospiroides dubius* (mouse hookworm), and migratory stages of *Ascaris suum*.

Other susceptible helminths include *Toxocara canis*, found in naturally infested dogs. Also, parasitic to this host are *Ancylostoma canium*, *Trichuris vulpis* (whipworm), and *Physalaptera spp*.

Compounds of Formula I have been demonstrated as efficacious against parasites of pigs, such as the migratory stages of *Ascaris suum*, thus preventing the development of verminous pneumonia. *Metastrongylus spp*, *Oseophagostomum spp*, *Trichuris spp*, and *Strongyloides spp*, are important parasites of swine.

Compounds of Formula I have also been demonstrated as efficacious against parasitic gastroenterities in sheep, such as *Haemonchus controtus*, *Ostertagia spp*, *Trichostrongylus spp*, *Nematodirus spp*, *Trichuris ovis*, *Cooperia spp*, *Chabertia spp*, and *Strongyloides papillosus*. *Bunostomum trigonocephalum*, *Oesophagostomum spp*, *Dictyocaulus filaria*, ssp are other important parasites.

Cattle have many parasites in common with sheep. For example, an important helminth of cattle is *Dictyocaulus viviparus*.

Animals of low weight are treated with unit doses ranging no higher than a few milligrams; whereas animals of high body weight, such as ruminants, require proportionately larger unit doses ranging up to several grams. Preferably, a single dose is administrated daily for each animal species based on the weight of that species.

The amount of ingredient administered will depend on the weight of the host, but will usually be between about 10 mg./kg. and 500 mg./kg. of body weight daily.

In practice, a pharmacologically active compound of structural Formula I is usually formulated with a nontoxic carrier therefor to give anthelmintic compositions of this invention. The carrier may be an orally ingestible container for the active ingredient, for example, a hard or soft gelatin capsule; or it may be a pharmaceutically acceptable diluent or excipient of the kind normally used in the production of medicaments, ready for use, for example maize starch, terra alba, lactose, sucrose, calcium phosphate, gelatin, talcum, stearic acid, magnesium stearate, dextrin, agar, pectin or acacia.

Exemplary of liquid carriers are peanut oil, olive oil, sesame oil, and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule, or compounded in the form of a troche or lozenge. The amount of solid carrier will vary widely but preferably will be from about 25 mg. to about 3 mg. If a liquid carrier is used, the preparation may be in the form of a soft gelatin capsule, placed in an ampule or in liquid suspension.

The compositions are most often made up in a form suitable for internal administration and may therefore take the form of a liquid, for example, an emulsion or a sterile solution or suspension in water, oil, such as arachis oil, or other liquid.

The compositions are advantageously made up in a dosage unit form adapted for the desired mode of administration. Thus, for the preferred oral administration, the dosage unit may take the form of a suspension, tablet, capsule, packaged powder, bolus, or encapsulated powder. The quantity of active ingredient in each dosage unit will be such that one or more units are required for each therapeutic administration.

As previously mentioned, the compounds of Formula I have general anthelmintic activity and accordingly a further and most important aspect of this invention provides a method of treating helminthic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 10 mg./kg. to about 500 mg./kg. depending on the species of host and regimen used. One dose per day administration is preferred but up to five of the dosage units described above may be used if desired.

Where tableting is used, the resulting tablets are then coated with methyl methacrylate to form an enteric coating, i.e., a coating which is substantially insoluble in gastric secretion but substantially soluble in intestinal fluids.

It will be appreciated that the active ingredient used in the formulation of the tablets described above may be replaced with other compounds of Formula I having the necessary anthelmintic activity. Furthermore, other materials may be used to form the enteric coating, for example other synthetic plastic materials such as methyl acrylate, cellulose derivatives, hydrogenated castor oil or phthalates.

The compositions thusly prepared are administered, usually orally, to an infected host from 1–5 times daily for anthelmintic activity.

The following examples illustrate syntheses which may be employed in formulating the compositions of the invention.

EXAMPLE 1

Preparation of 8-acetamidopurine

To a stirred solution of 30 g. of 4,5-diaminopyrimidine and 1.5 g. of potassium hydroxide in 375 ml. of ethanol is added 24 ml. of carbon disulfide in 75 ml. ethanol. The reaction mixture is refluxed for 5 hours, cooled, filtered, and the filter cake is washed with ethanol giving 8-thiopurine. The product was dried in vacuo.

Eleven g. of 8-thiopurine is dissolved in 160 ml. of 5% aqueous NaOH. To the stirred solution is added over a 20 minutes period, 10.4 ml. of methyl iodide. After stirring for 1.5 hours, the pH is adjusted to 5 and the reaction mixture is refrigerated. The 8-methylthiopurine was filtered off and dried in vacuo.

Five g. of 8-methylthiopurine, 12 ml. of 17 N $NH_4OH$ and 12 m/o of $H_2O$ are placed in a glass bomb. A catalytic amount of cupric acetate and copper bronze powder are added, the bomb is then cooled to room temperature, opened and the reaction mixture is distilled off in vacuo. The resultant residue is dissolved in a minimum of dilute aqueous HCl; the solution is charcoaled, filtered, and the pH is adjusted to ca. 7. The suspension is cooled in an ice-water bath, the 8-aminopurine was then filtered off, washed with $H_2O$ and dried in vacuo.

Acetyl chloride (0.6 g.) was added to a suspension of 8-aminopurine (1.5 g.) [see A. Albert and D. J. Brown, J. Chem. Soc., 2060 (1954)] and the mixture heated at reflux for 2.5 hr. The mixture was cooled, poured into water and the precipitated solid collected. The solid was suspended in water, dilute HCl was added until the solid had dissolved then the solution was decolorized and the pH adjusted to 6.5. The tan solid was collected, washed well with water and dried to give a moderate yield of 8-acetamido-purine, M.P. >300° C.

EXAMPLE 2

Preparation of 8-cyclopropanamidopurine

Using the procedure described in Example 1, the desired product is obtained from 1 g. of 8-aminopurine in 15 ml. of pyridine and 0.77 g. of cyclopropylcarboxylic acid chloride to yield 0.5 g. product, M.P. >300° C.

EXAMPLE 3

Preparation of purine-8-carbamic acid, methyl ester

To a stirred solution of 20 g. of 4,5-diaminopyrimidine in 500 ml. of water is added 37.5 g. of diacetyl-S-methylpseudothiourea. The reaction mixture is refluxed gently for about 6 hours; first forming a brown cloudy solution which evolves to a light solid as methyl mercaptan evolves. After mercaptan evolution ceases, the light solid is cooled at 0° C., and the solid is filtered off, washed with water, and air dried on a porous plate, giving 8.56 g. of a coral pink solid.

The solid is suspended in 500 cc. of water, with dilute HCl being added to form a brown solution, which is decolorized, to give an almost colorless filtrate. The filtrate is neutralized to pH 6.5 giving a finely divided white solid, which upon reheating on a steam bath, followed by cooling, gives a filterable solid. This was filtered, washed with $H_2O$, and vacuum dried, yielding 7.22 g. product, M.P. 258–260° C. (dc.).

EXAMPLE 4

Preparation of 2-n-butylpurine-8-carbamic acid, methyl ester

Dicarbomethoxy-S-methylpseudothiourea (37.5 g.) is added to a solution of 2-n-butyl-4,5-diaminopyrimidine (30 g.) [see D. J. Brown, J. Chem. Soc., 2312 (1956)] in 500 ml. of water. The mixture is heated at reflux until evolution of methyl mercaptan ceased (7 hr.), then it is cooled to 5°, filtered, and the collected solid is washed well with water.

The solid was suspended in 500 ml. of water and the dilute HCl is added until almost all of the solid dissolved. After treatment with decolorizing carbon, the filtrate is neutralized to pH 6.5, and the precipitated white solid is collected, washed with water and dried.

EXAMPLE 5

Preparation of 2,6-dimethyl-8-propionamidopurine

To a stirred solution of 7 g. of 4,5-diamino-2,6-dimethylpyrimidine and 1.5 g. of potassium hydroxide in 375 ml. of ethanol is added 24 ml. of carbon disulfide in 75 ml. ethanol. The reaction mixture is refluxed for 5 hours, cooled, filtered, and the filter cake is washed with ethanol giving 8-thiopurine. The product was dried in vacuo.

Eleven g. of the 8-thiopurine is dissolved in 160 ml. of 5% aqueous NaOH. To the stirred solution is added over a 20 minute period, 10.4 ml. of methyl iodide. After stirring for 1.5 hours, the pH is adjusted to 5 and the reaction mixture is refrigerated. The 8-methylthiopurine was filtered off and dried in vacuo.

Five g. of 2,6-dimethyl-8-methylthiopurine, 12 ml. of 17 N $NH_4OH$ and 12 m/o of $H_2O$ are placed in a glass bomb. A catalytic amount of cupric acetate and copper bronze powder are added, the bomb is then cooled to room temperature, opened and the reaction mixture is distilled off in vacuo. The resultant residue is dissovled in a minimum of dilute aqueous HCl; the solution is charcoaled, filtered, and the pH is adjusted to ca. 7. The suspension is cooled in an ice-water bath, the 8-amino-2,6-dimethylpurine was then filtered off, washed with $H_2O$ and dried in vacuo.

To a suspension of 1.8 g. of 8-amino-2,6-dimethylpurine in 9 ml. of pyridine is added 0.71 g. of propionyl chloride. The reaction mixture is mildly exothermic; then it is refluxed gently for 2.5 hours, and finally poured into ice water, giving a brownish solid. The resultant precipitate is filtered off, washed with water, and then dissolved in a minimum of dilute aqueous HCl. This solution is decolorized, filtered, and the filtrate neutralized to a pH of ca. 6.8, giving a light brown product. The purified 2,6-dimethyl-8-propionamidopurine is filtered off, water washed, and dried in vacuo, M.P. 300° C.

EXAMPLE 6

Preparation of purine-8-carbamic acid, alkyl and aryl esters

When the following substituted 4,5-diaminopyrimidine and pseudothioureas are substituted respectively for the o-diaminopyridine and pseudothiourea used in the procedure of Example 4, the corresponding listed products are obtained:

| o-Diamine | Dicarbalkoxy-S-methyl pseudothiourea | Product |
| --- | --- | --- |
| 4,5-diamino-2-butylpyrimidine | Dicarballyloxy-S-methyl pseudothiourea. | 2-butylpurine-8-carbamic acid, allyl ester. |
| 4,5-diamino-6-butylpyrimidine | Dicarb-2-methallyloxy-S-methyl pseudothiourea. | 6-butylpurine-8-carbamic acid, methallyl ester. |
| 4,5-diamino-2-butylpyrimidine | Dicarbcyclopropoxy-S-methyl pseudothiourea. | 2-propylpurine-8-carbamic acid, cyclobutyl ester. |
| 4,5-diamino-6-propylpyrimidine | Dicarbcyclobutoxy-S-methyl pseudothiourea. | 6-propylpurine-8-carbamic acid, cyclobutyl ester. |
| 4,5-diamino-2-ethylpyrimidine | Dicarbcyclopentyloxy-S-methyl pseudothiourea. | 2-ethylpurine-8-carbamic acid, cyclopentyl ester. |
| 4,5-diamino-6-methylpyrimidine | Dicarb-1-naphthyloxy-S-methyl pseudothiourea. | 6-methylpurine-8-carbamic acid, naphthyl ester. |
| 4,5-diamino-2-butoxypyrimidine | Dicarbphenyloxy-S-methyl pseudothiourea. | 2-butoxypurine-8-carbamic acid, phenyl ester. |
| 4,5-diamino-6-propoxypyrimidine | Dicarbethyloxy-S-methyl pseudothiourea. | 6-propoxypurine-8-carbamic acid, ethyl ester. |
| 4,5-diamino-2-ethoxypyrimidine | Dicarb-n-propyloxy-S-methyl pseudothiourea. | 2-ethoxypurine-8-carbamic acid, n-propyl ester. |
| 4,5-diamino-6-methoxypyrimidine | Dicarbisopropyloxy-S-methyl pseudothiourea. | 6-methoxypurine-8-carbamic acid, isopropyl ester. |
| 4,5-diamino-2-decylpyrimidine | Dicarb-n-butyloxy-S-methyl pseudothiourea. | 2-decylpurine-8-carbamic acid, n-butyl ester. |
| 4,5-diamino-2-heptylpyrimidine | Dicarb-3-methylbutoxy-S-methyl pseudothiourea. | 2-heptylpurine-8-carbamic acid, 3'-methylpentyl ester. |
| 4,5-diamino-6-octyloxypyrimidine | Dicarb-3-methylpentyloxy-S-methyl pseudothiourea. | 6-octyloxypurine-8-carbamic acid, 3'-methylpentyl ester. |
| 4,5-diamino-2-bromopyrimidine | Dicarb-n-heptyloxy-S-methyl pseudothiourea. | 6-bromopurine-8-carbamic acid, n-heptyl ester. |
| 4,5-diamine-6-trifluoromethyl pyrimidine. | Dicarb-4-ethylheptyloxy-S-methyl pseudothiourea. | 6-trifluoromethylpurine-8-carbamic acid, 4'-ethylheptyl ester. |
| 4,5-diamino-2-carbopropoxypyrimidine. | Dicarbmethylcyclopropyloxy-S-methyl pseudothiourea. | 2-carboprooxypurine-8-carbamic acid, methylcyclopropyl ester. |

EXAMPLE 7

Preparation of substituted purine-8-carbamic acid, alkyl esters

When the following substituted 4,5-diaminopyrimidine are used in place of 4,5-diaminopyrimidine of Example 4, the corresponding listed products are obtained.

| Starting material | Product |
| --- | --- |
| 4,5-diamino-2-methylpyrimidine | 2-methylpurine-8-carbamic acid, methyl ester. |
| 4,5-diamino-6-ethylpyrimidine | 6-ethylpurine-8-carbamic acid, methyl ester. |
| 4,5-diamino-2-isopropylpyrimidine | 2-isopropylpurine-8-carbamic acid, methyl ester. |
| 4,5-diamino-6-butylpyrimidine | 6-butylpurine-8-carbamic acid, methyl ester. |
| 4,5-diamino-2-isoamylpyrimidine | 2-isoamylpurine-8-carbamic acid, methyl ester. |
| 4,5-diamino-2-ethoxypyrimidine | 2-ethoxypurine-8-carbamic acid, methyl ester. |
| 4,5-diamino-6-isopropoxypyrimidine. | 6-isopropoxypurine-8-carbamic acid, methyl ester. |
| 4,5-diamino-2-n-pentoxypyrimidine. | 2-n-pentoxypurine-8-carbamic acid, methyl ester. |
| 4,5-diamino-2-phenylpyrimidine | 2-phenylpurine-8-carbamic acid, methyl ester. |
| 4,5-diamino-6-chloropyrimidine | 6-chloropurine-8-carbamic acid, methyl ester. |
| 4,5-diamino-2-trifluoromethylpyrimidine. | 2-trifluoromethylpurine-8-carbamic acid, methyl ester. |
| 4,5-diamino-6-ethylthiopyrimidine | 6-ethylthiopurine-8-carbamic acid, methyl ester. |
| 4,5-diamino-2-ethylaminopyrimidine. | 2-ethylaminopyrimidine-carbamic acid, methyl ester. |
| 4,5-diamino-6-dimethylaminopyrimidine. | 6-dimethylaminopurine-8-carbamic acid, methyl ester. |
| 4,5-diamino-2-dimethylaminomethyl pyrimidine. | 2-dimethylaminomethylpurine-8-carbamic acid, methyl esters. |
| 4,5-diamino-6-hydroxypyrimidine | 6-hydroxypurine-8-carbamic acid, methyl ester. |
| 4,5-diamino-2-carbmethoxypyrimidine. | 2-carbmethoxypurine-8-carbamic acid, methyl ester. |

EXAMPLE 8

Preparation of substituted purines-8-carboxamides

When the following substituted o-diamines and carboxylic acid halides are substituted, respectively, for the 4,5-diaminopyrimidine and cyclopropylcarboxylic acid chloride used in the procedure of Example 2, the corresponding listed products are obtained:

| o-Diamine | Acid halide | Product |
| --- | --- | --- |
| 4,5-diamino-2-butylpyrimidine | Allyl carbonyl chloride | N-{8-(2-butylpurinyl)}-allyl carboxamide. |
| 4,5-diamino-6-butylpyrimidine | 2-methallyl carbonyl chloride | N-{8-(6-butylpurinyl)}-2-methallyl carboxamide. |
| 4,5-diamino-6-butylpyrimidine | Cyclopropyl carbonyl chloride | N-{8-(6-butylpurinyl)}-cyclopropyl carboxamide. |
| 4,5-diamino-2-propylpyrimidine | Cyclobutyl carbonyl chloride | N-{8-(2-propylpurinyl)}-cyclobutyl carboxamide. |
| 4,5-diamino-6-ethylpyrimidine | Cyclopentyl carbonyl chloride | N-{8-(ethylpurinyl)}-cyclopentyl carboxamide. |
| 4,5-diamino-2-methylpyrimidine | 1-naphthoyl chloride | N-{8-(2-methylpurinyl)}-naphthamide. |
| 4,5-diamino-6-butoxypyrimidine | Benzoyl chloride | N-{8-(6-butoxypurinyl)}-benzamide. |
| 4,5-diamino propoxypyrimidine | Propionyl chloride | N-{8-(2-propoxypurinyl)}-propionamide. |
| 4,5-diamino-2-ethoxypyrimidine | Butyryl chloride | N-{8-(2-ethoxypurinyl)}-butyramide. |
| 4,5-diamino-6-methoxypyrimidine | n-Butyryl chloride | N-{8-(6-methoxypurinyl)}-n-butyramide. |
| 4,5-diamino-6-decylpyrimidine | Valeryl chloride | N-{8-(2-decylpurinyl)}-valeramide. |
| 4,5-diamino-2-heptylpyrimidine | 4-methylbutyryl chloride | N-{8-(2-heptylpurinyl)}-4'-methylbutyramide. |
| 4,5-diamino-6-octylpyrimidine | 3-methylhexanoyl chloride | N-{8-(6-octyloxypurinyl)}-3'-methylhexanamide. |
| 4,5-diamino-6-bromopyrimidine | Octanoyl chloride | N-{8-(6-bromopurinyl)}-octanamide. |
| 4,5-diamino-2-trifluoromethyl pyrimidine. | 5-ethyloctanoyl chloride | N-{8-(2-trifluoromethyl)}purinyl)-5'-ethyloctanamide. |
| 4,5-diamino-2-carbopropoxy pyrimidine. | Methylcyclopropyl carbonyl | N-{(2-carborpopoxypurinyl)}-methylcyclopropylcarboxamide. |
| 4,5-diamino-6-butylpyrimidine | Acetyl chloride | N-{8-(2-butylpurinyl)}-acetamide. |

EXAMPLE 9

Typical cattle bolus containing an anthelmintic described herein

| | Grams |
|---|---|
| Purine-8-carbamic acid, methyl ester | 2.0 |
| Calcium phosphate | 2.5 |
| Maize starch | 0.54 |
| Talcum | 0.14 |
| Gum arabic | 0.15 |
| Magnesium stearate | 0.05 |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried materials then passed through a #16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a #10 mesh screen.

The above solid components are thoroughly mixed, giving a water dispersible powder. This powder can be directly admixed with water in concentrations on the order of 5 g. of powder to 5 cc. of water.

EXAMPLE 10

Novel sheep drench containing an anthelmintic purine

| | Parts by weight |
|---|---|
| 8-acetamidopurine | 60 |
| Terra Alba English | 16 |
| Methyl cellulose | 1 |
| Polethylene glycol (Methocel 4000) | 20 |
| Antifoam AF [1] | 3 |

[1] Silicone emulsion supplied by Dow Chemical Co.

The above ingredients are suspended, one part powdered mixture to four parts water, and spray dried as is well known in the art.

EXAMPLE 11

Novel sheep drench containing an anthelmintic purine

| | Parts by weight |
|---|---|
| 8-Cyclopropylamidopurine | 80.0 |
| Polysorbate 80, U.S.P. | 6.0 |
| Instant Clear Gel, National Starch | 12.0 |
| Supercol-U-guargum, General Mills | 2.0 |

The above solid components are thoroughly mixed, giving a water dispersable powder. This powder can be directly admixed with water in concentrations on the order of 50 g. of powder to 16 oz. of water.

What is claimed is:

1. A purine having the formula

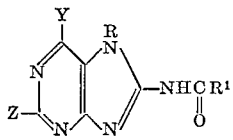

wherein:

R is hydrogen;

$R^1$ is lower alkyl, straight or branched, containing from one to five carbon atoms; lower alkoxy, straight or branched, containing from one to five carbon atoms; cyclo lower alkyl, including alkyl cycloalkyl, said cycloalkyl containing from three to five carbon atoms; cyclo lower alkoxy, including alkyl-cycloalkoxy, said cycloalkoxy containing from three to five carbon atoms; lower alkenyloxy, straight or branched, containing from three to four carbon atoms; or phenyl; and Y and Z are hydrogen; lower allyl straight or branched, containing from one to five carbon atoms; lower alkoxy, straight or branched, containing from one to five carbon atoms; bromo; chloro; hydroxy; lower alkyl thio of one to two carbon atoms; lower alkylamino of one to two carbon atoms; or di lower alkylamino, each alkyl group having one to two carbon atoms.

2. A compound according to claim 1, wherein R' is lower alkyl and R is hydrogen.

3. A compound according to claim 2, wherein R' is methyl and Y and Z are hydrogen, being the compound 8-acetamidopurine.

4. A compound according to claim 1, wherein R' is cyclopropyl and R, Y, and Z are hydrogen, being the compound 8-cyclopropaneamidopurine.

5. A compound according to claim 1, wherein R is hydrogen, R' is ethyl, and Y and Z are methyl, being the compound 2,6-dimethyl-8-propionamidopurine.

6. A compound according to claim 1, wherein R' is methoxy.

7. A compound according to claim 6, wherein Y, Z, and R are hydrogen, being the compound purine-8-carbamic acid, methyl ester.

8. A compound according to claim 6, wherein Z is butyl and Y and R are hydrogen, being the compound 2-butyl-purine-8-carbamic acid, methyl ester.

References Cited

UNITED STATES PATENTS 3,114,751  12/1963  Whetstone  260—252

ALEX MAZEL, Primary Examiner

A. M. T. TIGHE, Assistant Examiner

U.S. Cl. X.R.

424—253

PO-1050
(5/69)

UNITED STATES PATENT OFFICE
CERTIFICATE OF CORRECTION

Patent No. 3,536,711     Dated October 27, 1970

Inventor(s) George L. Dunn and Berthold Richard Vogt

It is certified that error appears in the above-identified patent and that said Letters Patent are hereby corrected as shown below:

Claim 1, after "Y and Z are hydrogen;" change "lower allyl" to "lower alkyl".

Correct the name of the second inventor to read "Berthold Richard Vogt".

SIGNED AND
SEALED
JAN 26 1971

(SEAL)
Attest:

Edward M. Fletcher, Jr.
Attesting Officer

WILLIAM E. SCHUYLER, JR.
Commissioner of Patents